United States Patent [19]
Welch et al.

[11] Patent Number: 5,922,039
[45] Date of Patent: Jul. 13, 1999

[54] ACTIVELY STABILIZED PLATFORM SYSTEM

[75] Inventors: Raymond V. Welch, Lovettsville, Va.; William W. Dorsey, Potomac, Md.; Stephen J. Fujikawa, Gambrills, Md.; Charles F. Settgast, Gaithersburg, Md.; David Reed, Silver Spring, Md.

[73] Assignee: Astral, Inc., Lovettsville, Va.

[21] Appl. No.: 08/716,568

[22] Filed: Sep. 19, 1996

[51] Int. Cl.$^6$ .................................................. G06F 19/00
[52] U.S. Cl. .......................... 701/116; 701/50; 701/70; 701/79; 280/5.507
[58] Field of Search ................................ 701/50, 70, 116, 701/79, 37, 71; 180/168, 183; 280/5.507, 5.519; 340/467

[56] References Cited

U.S. PATENT DOCUMENTS

| | | | |
|---|---|---|---|
| 3,860,931 | 1/1975 | Pope et al. | 343/709 |
| 4,143,312 | 3/1979 | Duckworth et al. | 343/709 |
| 4,596,989 | 6/1986 | Smith et al. | 343/709 |
| 4,621,266 | 11/1986 | Le Gall et al. | 342/359 |
| 4,647,939 | 3/1987 | Kolhoff | 343/765 |
| 4,672,752 | 6/1987 | Hulsing, II et al. | 73/152.54 |
| 4,827,269 | 5/1989 | Shestag et al. | 343/766 |
| 4,920,349 | 4/1990 | Le Gall | 343/709 |
| 4,920,350 | 4/1990 | McGuire et al. | 343/709 |
| 5,092,625 | 3/1992 | Kawabata | 280/5.501 |
| 5,111,212 | 5/1992 | DeSatnich et al. | 343/709 |
| 5,202,695 | 4/1993 | Hollandsworth et al. | 342/359 |
| 5,223,845 | 6/1993 | Eguchi | 342/359 |
| 5,227,806 | 7/1993 | Eguchi | 343/765 |
| 5,359,337 | 10/1994 | Eguchi | 343/765 |
| 5,367,459 | 11/1994 | Shtarkman et al. | 701/37 |
| 5,701,691 | 12/1997 | Watanabe et al. | 701/50 |
| 5,747,971 | 5/1998 | Rozman et al. | 322/10 |

OTHER PUBLICATIONS

Gyroscope Free Strapdown Inertial Measurement Unit by Six Linear Accelerometers, Jeng–Heng Chen et al., Journal of Guidance, Control, and Dynamics, vol. 17, No. 2, Mar.–Apr. 1994.

*Primary Examiner*—William A. Cuchlinski, Jr.
*Assistant Examiner*—Gertrude Arthur

[57] ABSTRACT

A stabilized platform useable for various purposes to provide compensation for motion in two axes, such as pitch and roll on a ship. The system operates independently of the object to be stabilized and without the use of gyroscopes by using accelerometers, position sensors and a proportional drive controller augmented with estimation and filtering. The mechanical design reduces size, weight, and power requirements, by providing a system including a stabilized structure; a base structure for supporting the stabilized structure; an enclosure to protect the system from environment elements; first sensors for measuring angular displacements of the stabilized structure with respect to the base structure; and second sensors for measuring acceleration data and acceleration vector angles; and a processor for receiving the angular displacements of the stabilized structure with respect to the base structure from the first sensors and determining an angle of the base structure relative to the stabilized structure, for receiving the acceleration data and acceleration vector angles from the second sensors and determining a direction of local vertical relative to the base structure, and for maintaining the stabilized structure at a desired orientation utilizing the angle of the base structure relative to the stabilized structure and the direction of local vertical relative to the base structure.

49 Claims, 6 Drawing Sheets x-y-z AXES FIXED TO BASE STRUCTURE 14

X-Y-Z AXES ARE LOCAL HORIZONTAL/ LOCAL VERTICAL AXES $\Theta, \zeta, \& \eta$ ARE EULER ANGLES $\Theta$ = OFF-VERTICAL ANGLE OF PLATFORM (OR HOST)

$\zeta$ = DIRECTION OF OFF-VERTICAL PLANE (z-Z; i.e. PLANE IN WHICH $\Theta$ IS DEFINED) RELATIVE TO LINE-OF-NODES $\Theta$ AND $\zeta$ ARE REQUIRED CONTROL SYSTEM ERROR SIGNALS

ACTIVELY STABILIZED PLATFORM SYSTEM

BACKGROUND OF THE INVENTION

1. Field of the Invention

This invention relates to a stabilization system which maintains a platform in a specified orientation relative to the local vertical, while located on a moving vehicle which is subject to both linear and angular motion. Applications of such a stabilization system include a shipboard system used to maintain a locally horizontal surface to stabilize an antenna pointing at a signal source or one used to support a horizon pointing device. Applications of a sensor suite portion of the stabilization system also include warning systems for land or sea-based vehicles or platforms which alert occupants of a vehicle to prevent accidental rollover of the vehicle.

Until recently, antennas used for ship communication were large (3 to 4' in diameter) and heavy (over 100 Lbs.). Now, with the advent of mobile communications satellites, antenna sizes for land mobile vehicles have been significantly reduced to under 30 lbs. This new situation has opened the opportunity for the use of such antennas on smaller ships, if an economical method of eliminating the effects of ship roll and pitch is available. The availability of a small, low cost stabilized platform would also allow the use of the new, small land-based direct broadcast TV antennas on these smaller ships.

Another area where such a small, low cost stabilized platform would be useful is in the application of radar on small boats, such as fishing boats and pleasure yachts. A stabilized platform for radar would provide much improved clarity under extreme sea conditions.

2. Description of the Related Art

The approach taken by the related art can be described in two broad categories: 1) pointing and stabilization are performed together with one mechanism; 2) pointing and stabilization are separate mechanisms.

This invention addresses the second category and, more specifically, the stabilization mechanism only. Further, this invention addresses active stabilization as opposed to passive stabilization. Typically, passive stabilization systems use weights as pendulums to control their platforms/antennas.

Most related art ignores the fact that the location of the stabilized platform center-of-gravity (c.g.) directly affects the torques required from the control driver motors. Even when this fact is recognized, it is ignored in design considerations, apparently because, for the large antennas considered in the prior art, the additional torque required is small compared to the torque required to drive the antenna. For small, light weight antennas, the increase in torque needed to stabilized the antenna is significant when the c.g. is offset from the axes of rotation. This additional torque increases as a direct function of the distance from the ship's axes of rotation. For small yachts this distance can be easily 25 feet, while for larger ships it can be 100 or more feet.

Stabilization of a platform in a specified orientation to the local vertical requires a control system to have a continuous estimate of the direction of local vertical. Prior art uses several techniques to provide the required information. A description of these techniques is provided in paragraphs (1) through (5) below.

(1) External Reference Data, Typified by Data Provided by the Host Vehicle's Reference System.

This technique is efficient, and adds little complexity. However, the reliance on the vehicle's system prevents stabilization system autonomy and does not solve the stabilization for vehicles, such as small ships, that do not have an applicable reference system.

(2) Inertial Reference Units Including Combinations of Gyroscopes and Accelerometers.

This technique provides local vertical estimates while also maintaining a coordinate reference system for estimating linear and angular motion of the host vehicle. These units require periodic calibration to compensate for drift of components. When only the estimate of the direction of the local vertical is necessary, these units are overly complicated, expensive and heavy.

(3) Passive Approaches Typified by Pendula and/or Various Forms of Inclinometers.

These components are relatively simple and inexpensive. However, they do not measure the direction of the local vertical but rather the direction of the local acceleration vector which will include the effects of any present linear or angular accelerations. The presence of such accelerations in moving vehicles results in unacceptable errors when this approach is employed for the applications being addressed herein. Without compensation for these acceleration effects, this technique is inadequate for the applications being addressed.

(4) Single Axis Acceleration Compensation for Inclinometers.

While appropriate for some applications (e.g. road graders), the present invention will provide stabilization about two axes.

(5) Accelerometer Arrays Providing Essentially the Same Reference System as that Provided by an Inertial Reference Unit.

This technique continuously estimates the angular acceleration vector (three directions) of the base on which the sensors are mounted. The acceleration data are twice integrated to provide a continuous estimate of the angular orientation of the base and, therefore, a continuous estimate of the direction of local vertical. The sensors employed are subject to periodic calibration requirements and are subject to random walk divergence over time introduced in the integration of imprecise or noisy measurements of the angular acceleration. This technique also requires the precision mounting of a minimum of nine accelerometers relative to one another in both linear and angular orientation. To obtain high precision, linear separations must be significant, but mechanical flexure of the mounting surface must be precluded.

SUMMARY OF THE INVENTION

This invention concerns a stabilized platform intended to overcome the problems with prior art systems and provide a continuously stabilized surface parallel to the local horizontal plane. This invention overcomes reliance on a vehicle's reference system, eliminates the expense of a gyroscope, overcomes the limitations of passive systems, provides correction for motion in more than one axis, eliminates errors due to sensor drift and random walk, and minimizes torque effects induced by the host vehicle.

This stabilization system is particularly suited to smaller vessels/vehicles where size, weight, and power resources must be reduced and conserved. This invention reduces destabilizing loads and torques, thus overcoming the inconveniences of previous designs and providing a lighter weight, lower power and smaller size stabilization system.

In one implementation, a base structure supports the stabilized platform, the electronics, the sensors, the gimbals and drive motors, and the protective dome enclosure. FIG. 1 illustrates this implementation. Two key mechanical features of this implementation are the weights used to move the c.g. onto the axes of rotation of the concurrent axes gimbal design. These features reduce the destabilizing loads and torques. Wind loads and torques are eliminated by the use of a radome. The effect of the moment of inertia (MOI) of the moving parts is also reduced.

The sensor employed to estimate the direction of the local vertical comprises two dual-axis inclinometers, one single-axis inclinometer, and one single-axis accelerometer. The angular measurements provided by the dual-axis and single-axis inclinometers and the acceleration measurement provided by the single-axis accelerometer are combined within a processor to compensate for the effects of linear accelerations, thereby leaving only the indication of the direction of the local gravity vector. This process is accomplished by deriving the instant angular acceleration vector and twice integrating this over time to obtain the direction of the local gravity vector.

An alternate sensor configuration replaces the single-axis inclinometer with a dual-axis inclinometer and adds a second single-axis accelerometer which permits a more accurate estimate of local vertical by deriving the angular velocity vector, in addition to the angular acceleration vector, directly from measurement data (i.e. the estimate of angular velocity is not obtained by integrating the angular acceleration vector as is the case for the three inclinometer and one accelerometer configuration). This alternate configuration leads to a more accurate and more time-stable estimate of local vertical.

The inclinometers are of the fluid sensing variety in order to avoid errors accruing with time due to drifting of components. Long term averaging of inclinometer measurements is used to correct not only for drift effects of the accelerometers but to correct any divergence of local vertical estimates that may occur due to random walk caused by either or both measurement precision and measurement noise.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

The preferred embodiments of the actively stabilized platform system 10 of the present invention are described in this section with reference to FIGS. 1 through 6.

Overall System Structure and Major Sub-Assemblies

Figure 1:
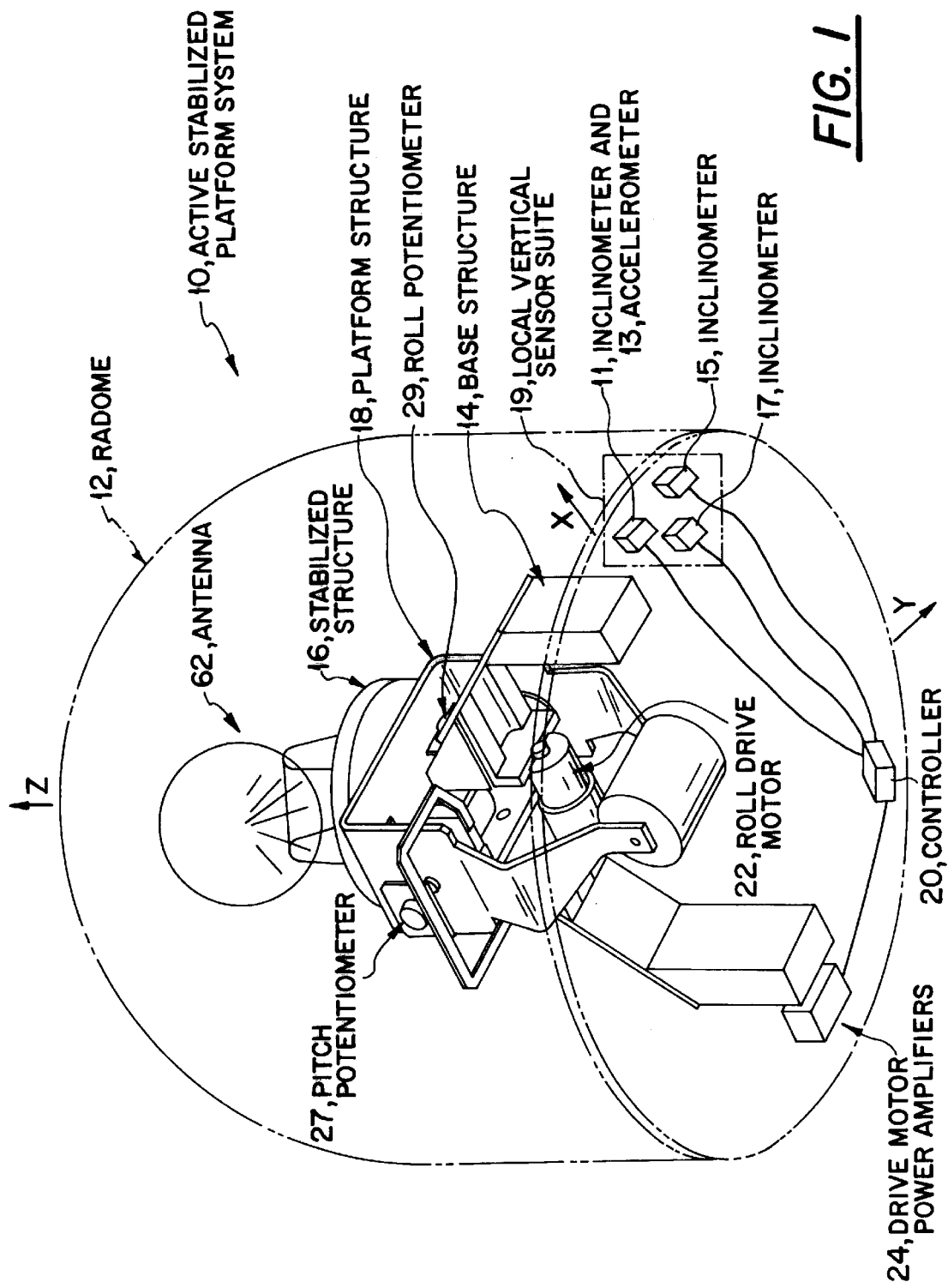
FIG. 1 illustrates the active stabilized platform system in one embodiment of the present invention.
Figure 2:
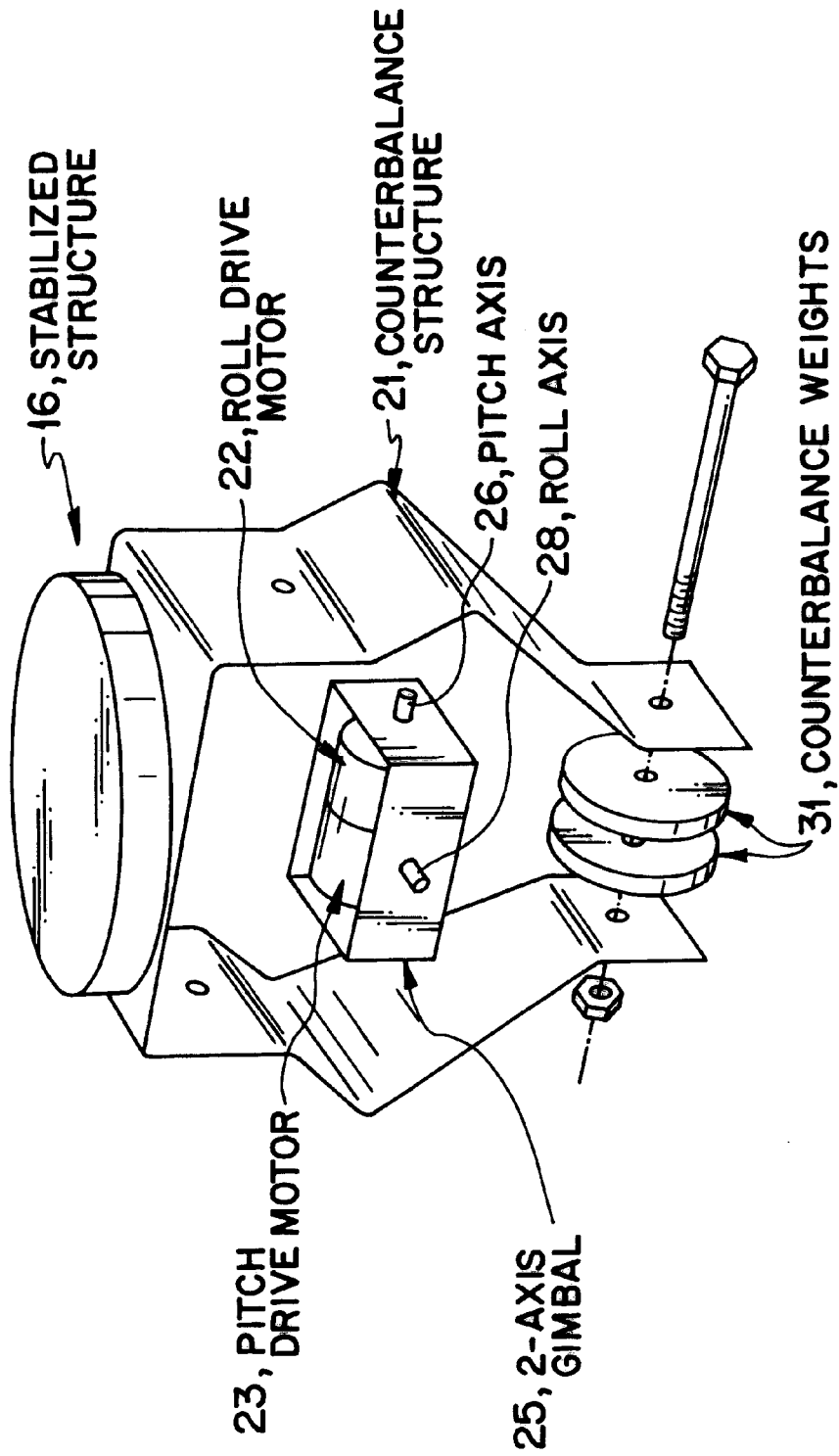
FIG. 2 is an enlarged view of the stabilized structure of the first embodiment of the present invention.

The principle mechanical design will be discussed first. There are three major mechanical subassemblies of the stabilized platform: (1) the protective enclosure or radome 12, (2) the base structure 14 and (3) the stabilized structure 16, which further includes a platform structure 18 and a counterbalance structure 21. FIGS. 1 and 2 show the stabilized structure 16 and these subassemblies. Each of the three (3) subassemblies serves a specific purpose in the overall active stabilized platform system 10.

Size, weight and power requirements of the active stabilized system 10 depend, to a large extent, on the loads and torques presented by the payload 60 to be stabilized. In FIG. 1, this payload 60 is antenna 62. There are four major factors that directly affect the loads and torques to be overcome by the actively stabilized platform system 10: (1) environmental loads (wind, rain, snow, ice, etc.) and torques on the stabilized structure 16; (2) the moment of inertia (MOI) of the moving parts (stabilized structure 16); (3) the center of gravity location of the movable parts; and (4) the acceleration forces on the moving parts resulting from the motion of the host vehicle.

The effects of environmental loads and torques are eliminated by placing the base structure 14 and the stabilized structure 16 in the protective enclosure or radome 12, shown in FIG. 1. The protective enclosure or radome 12 also provides protection for the bearings and other moving parts from harsh weather conditions.

The magnitude of the second factor, moment of inertia (MOI) of the movable stabilized structure 16 with the payload 60, is a function of the combined mass of the stabilized structure 16 and payload 60, and of the location of their c.g. The design of the stabilized structure 16, shown in FIG. 2, reduces the MOI of the stabilized structure 16 and payload 60 by reducing the structural mass and radius of gyration. There are two drive motors 22 and 23 used in this design: one motor 22 for the roll axis 28, and one motor 23 for the pitch axis 26. The roll axis drive motor 22, located on the stabilized structure 16, is placed as close as possible to the gimbal pitch axis in order to minimize its contribution to the MOI of the stabilized structure 16.

While the payload 60 mass cannot be controlled, its c.g. location can be adjusted. As shown in FIG. 2, the payload mounting surface is as close as possible to the axes of rotation (pitch axis 26 and roll axis 28) of the stabilized structure 16, thus minimizing the radius of gyration of the stabilized structure 16 and payload 60 and; therefore, their MOI.

The c.g. location of the stabilized structure 16 and payload 60 must be coincident with the gimbal centerline of each axis 26 and 28 to prevent added torque due to gravity that the drive motors 22 and 23 must overcome.

The fourth factor, acceleration forces resulting from the motion of the host vehicle, can be large when the actively stabilized platform system 10 is mounted far from the center of rotation of the host vehicle, such as high on the mast or superstructure of a ship. When the c.g. of the stabilized structure 16 and payload 60 combination is made coincident with the gimbal centerline for each axis, as shown in FIG. 2, the acceleration forces are carried by the gimbal bearings and no torque on the drive motors 22 and 23 is produced.

FIG. 2 shows the following design features to eliminate c.g. location effects:

concurrent axes on the dual-axis gimbal 25; and a counter balance structure 21 (including counter balance weights 31) with adjustable c.g.

The drive motors 22 and 23 in this embodiment are d.c. permanent magnet motors with integral gearheads. Since high speed drives are not required (less than 100 rpm would be acceptable), using step-down gears reduces the speed and increases the torque of the drive motors 22 and 23. This, in turn, reduces the weight and power of the drive motors 22 and 23. Other drive motors such as stepper and brushless d.c. motors are options that may be used.

Sensor Configuration

The local vertical sensor suite 19, illustrated in FIG. 1, provides a continuous estimate over time of the direction of local vertical relative to the base upon which it is mounted. The local vertical sensor suite 19 comprises two dual-axis 11 and 15 and one single axis 17 fluid level inclinometers plus one single-axis linear accelerometer 13. The inclinometers 11, 15, 17 are separated by known and fixed distances and the orientation of their sensor axes is known relative to one another. The single accelerometer 13 is mounted with its sensitive axis mutually perpendicular to the two sensitive axes of either of the two inclinometers 11 and 15.

Figure 3:
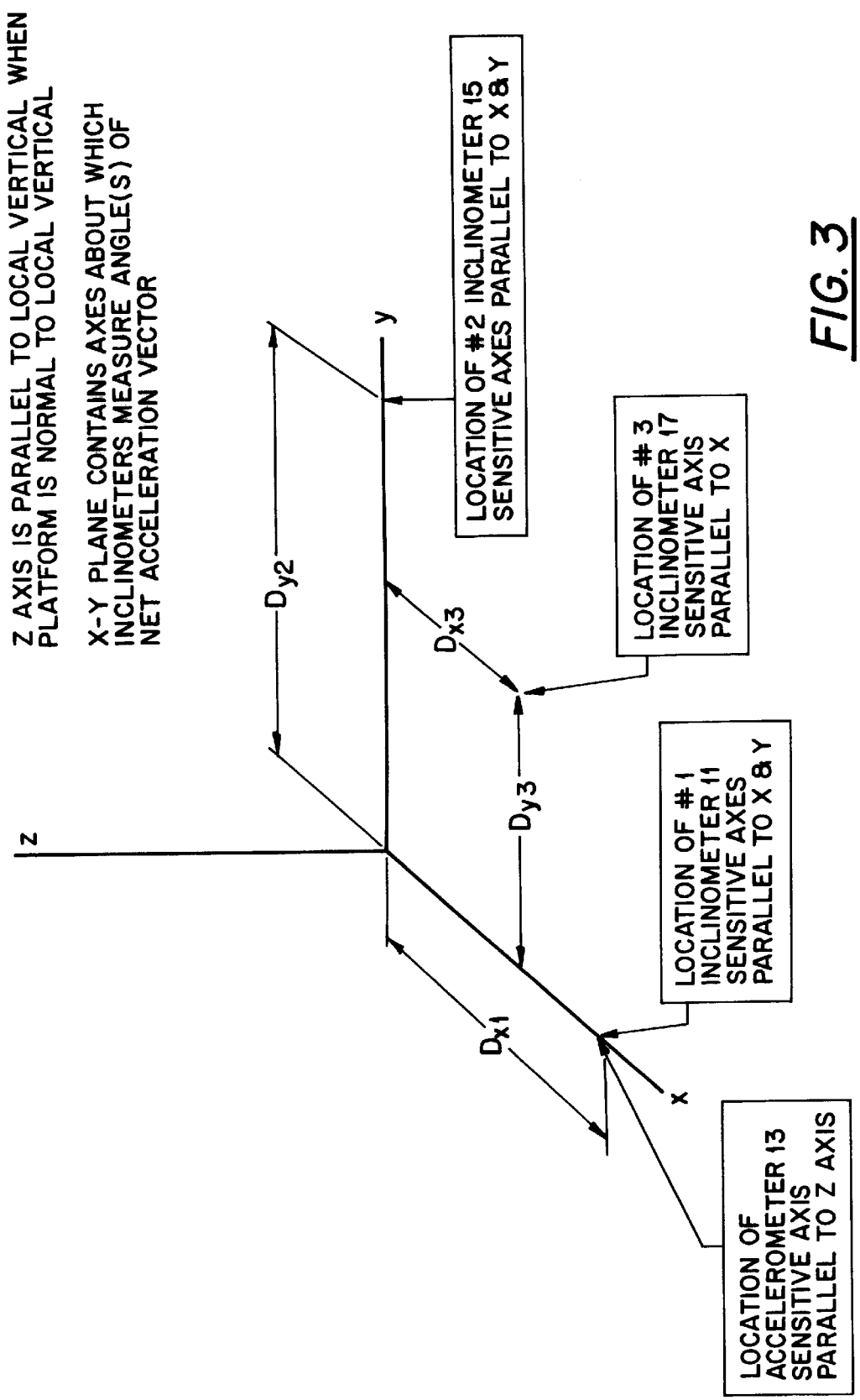
FIG. 3 illustrates the inclinometer and accelerator locations in one embodiment of the present invention.

An example of the orientation of the inclinometers 11, 15, 17 and the accelerometer 13 is shown in FIG. 3. When the x–y plane is aligned normal to the local vertical, the z axis is parallel to the local gravity vector (i.e. the x–y plane is then parallel to local horizontal). The inclinometers 11, 15, 17 are mounted so that their sensitive axes are parallel to one another and are contained within the indicated x–y plane (the base plane upon which the sensor suite 19 is mounted). The inclinometers 11, 15, 17 are also mounted so that they are separated by a known position vector relative to one another in the x–y plane. The linear accelerometer 13 is co-located with one of the inclinometers (in FIG. 3 the linear accelerometer 13 is co-located with inclinometer 11) and its sensitive axis is parallel to the z axis.

Note, the locations of the inclinometers 11, 15, 17 and accelerometer 13 described above and shown in FIG. 3 are to facilitate further description of how the direction of local vertical is derived. The only necessary requirements for their relative location and orientation is as follows:

(1) the sensitive axis of the co-located accelerometer 13 must be perpendicular to the sensitive axes of the inclinometer 11, 15, 17 (i.e. the axes about which the angular measurements are made);

(2) the sensitive axes of the inclinometers 11, 15, 17 must be parallel to one another but not necessarily co-planar; and (3) the inclinometers 11, 15, 17 can be located in any way relative to one another so long as their three components of position separation are known in the x,y,z coordinate system (the greater the separation, the more accurate the estimation of the direction of local vertical).

Processing

Figure 4:
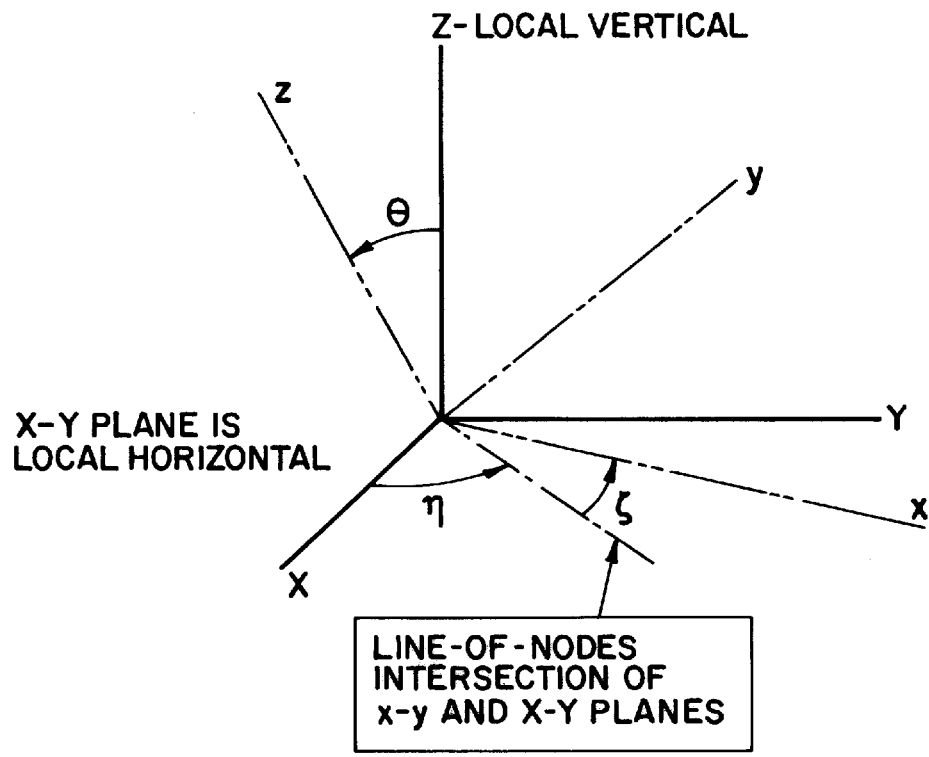
FIG. 4 illustrates the host vehicle reference axes and the stabilized platform system axes in one embodiment of the present invention.

The angular position of the stabilized structure 16 (actually the base upon which the sensor suite 19 is mounted) relative to local vertical/horizontal axes is specified by the three Euler angles—$\theta$, $\eta$, and $\zeta$ indicated in FIG. 4. As indicated in this Figure, the x,y,z, axes refer to the coordinate system within which the inclinometer/accelerometer combinations are fixed and known relative to one another. The X, Y, Z axes refer to the local horizontal/vertical coordinates. The angle $\theta$ is then the off-vertical angle of the z axis and $\zeta$ is the direction of the off vertical angle as seen in the x–y plane.

In general, a moving vehicle will experience arbitrary linear and angular motion relative to the local horizontal/vertical coordinates—i.e. X,Y,Z. The acceleration seen at a location defined in the x,y,z coordinates at distances $D_x$, $D_y$, $D_z$ from the origin can be represented by the following:

$$a_x = \alpha_x + g \sin\theta \sin\zeta + [\omega_y D_y + \omega_z D_z]\omega_x - (\omega_y^2 + \omega_z^2)D_x + \dot{\omega}_y D_z - \dot{\omega}_z D_y$$

And, for accelerometers with sensitive axes aligned with the y and z axes:

$$a_y = \alpha_y + g \sin\theta \cos\zeta + [\omega_x D_x + \omega_z D_z]\omega_y + (\omega_x^2 + \omega_z^2)D_y + \dot{\omega}_z D_x - \dot{\omega}_x D_z$$

$$a_z = \alpha_z + g \cos\theta + [\omega_x D_x + \omega_y D_y]\omega_z - (\omega_x^2 + \omega_y^2)D_z + \dot{\omega}_x D_y - \dot{\omega}_y D_x$$

In these expressions, $\alpha_x$, $\alpha_y$, and $\alpha_z$ are the x, y, z components of the linear acceleration vector, $\omega_x$, $\omega_y$, and $\omega_z$ are the x, y, z components of the angular velocity vector of the x, y, z axes relative to the X, Y, Z axes. Similarly, the $\omega$'s with a superscript dot are the x, y, z components of the angular acceleration vector of the x, y, z axes relative to the X, Y, Z axes.

If the inclinometers' 11 and 15 sensitive axes are parallel to the x and y axes and inclinometer 17 is parallel to the x axis, then the angles measured by the inclinometers 11, 15 and 17 about these axes will indicate the direction of the net acceleration vector in the plane perpendicular to the sensitive axis. For example, the angle measured by the x-sensitive axis of inclinometer 11 indicates the direction of the net acceleration vector in the y–z plane. Similarly, the angle measured by the y-sensitive axis of inclinometer 11 indicates the direction of the net acceleration vector in the x–z plane. In terms of the above acceleration components $a_x$, $a_y$, $a_z$, these two angles can be represented by:

$$\tan\beta_x = a_y/a_z$$

$$\tan\beta_y = a_x/a_z$$

where $\beta_x$ and $\beta_y$ are the angles measured by the inclinometer 11 about the x and y axes respectively.

If similar relationships are available for the second dual axis inclinometer 15 as well as the single axis inclinometer 17, then differencing measurements between the inclinometers 11, 15, 17 result in the following equations:

$$(a_{\omega z2} - a_{\omega z1})\tan\beta_{y2} - (a_{\omega x2} - a_{\omega x1}) = a_{z1}(\tan\beta_{y2} - \tan\beta_{y1})$$

$$(a_{\omega z2} - a_{\omega z1})\tan\beta_{x2} - (a_{\omega y2} - a_{wy1}) = a_{z1}(\tan\beta_{x2} - \tan\beta_{x1})$$

$$(a_{\omega z3} - a_{\omega z1})\tan\beta_{x3} - (a_{\omega y3} - a_{\omega y1}) = a_{z1}(\tan\beta_{x3} - \tan\beta_{x1})$$

where the $a_\omega$'s refer to the terms in the above equations for acceleration components that contain $\omega$'s or $\dot{\omega}$'s (but not $\alpha$ components nor components of g). Note, the third equation assumes the sensitive axis of the single axis inclinometer 17 is parallel to the x axis.

In these difference equations, the differences between acceleration components seen in the same direction serve to eliminate the terms of these components describing the linear acceleration components and the component due to the local gravity vector. The only place in these relationships where these effects are still present is in the z acceleration component (which is common to the definition of both angles about the x and y sensitive axes). This component is measured by the linear accelerometer 13 aligned with the z axis co-located with any one of the dual axis inclinometers. In these equations, this is the inclinometer 11.

These equations can then be seen to contain six unknowns at any single point in time. These are the three components of angular acceleration and angular velocity. If, from known initial conditions, the values of the angular velocity components at each point in time are obtained from the integration of estimates of angular acceleration, then the three unknowns (components of the angular acceleration vector) can be estimated from simultaneous solution of the three equations. With these estimates of the angular acceleration components between the x,y,z axes and the X,Y,Z axes, the time derivatives of the Euler angles are then determined by transformation. Continuous time integration of these derivatives provides a continuous estimate of the angle between the Z and z axes (i.e. the off vertical angle θ) and the direction of the off-vertical angle in the x–y plane (i.e. the angle ζ). This processing is performed by microprocessor 40 illustrated in FIG. 6 and described below.

Alternate Sensor Configuration

Figure 5:
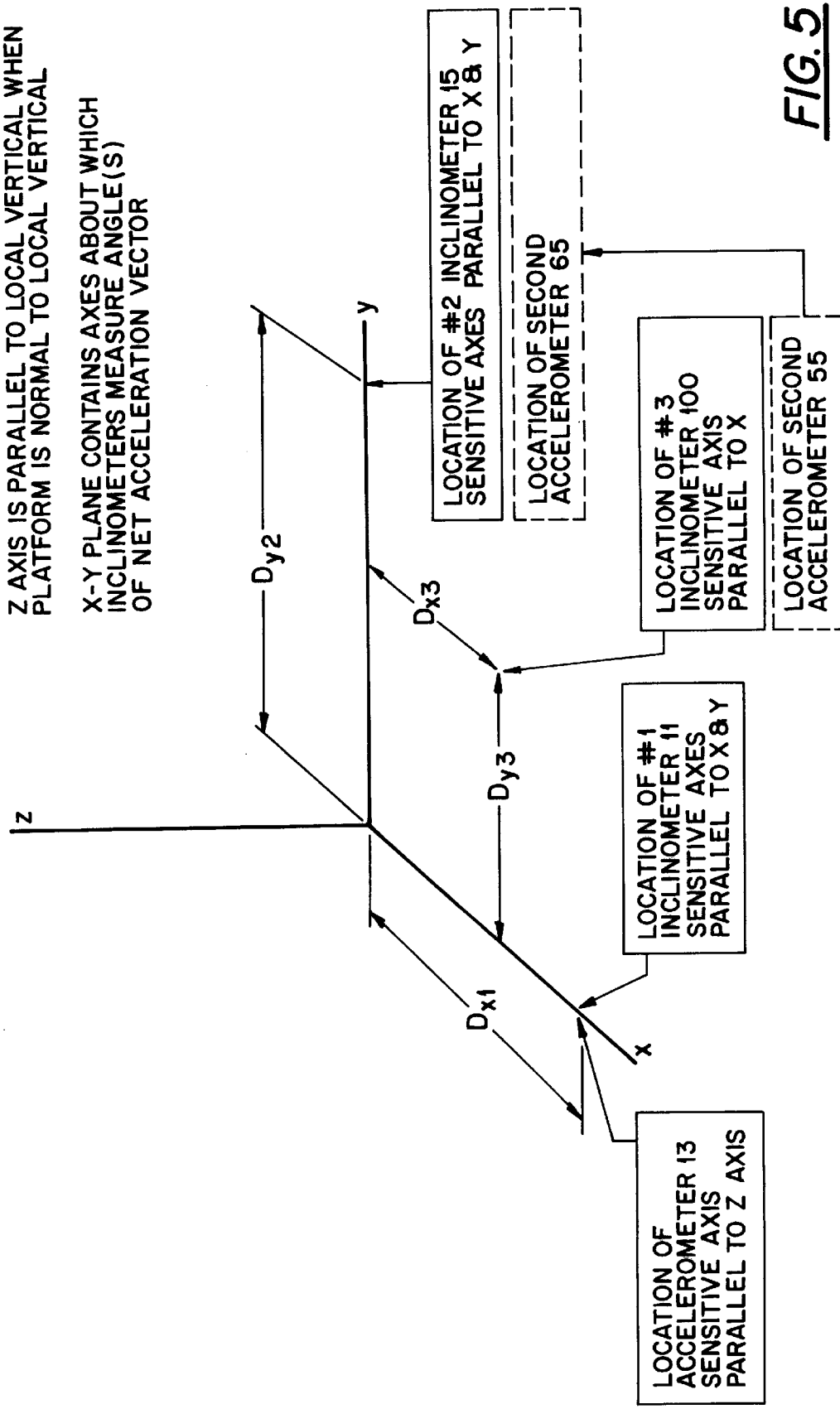
FIG. 5 illustrates the inclinometer and accelerator locations in alternate embodiments of the present invention.

FIG. 5 illustrates an alternate sensor configuration where the single axis inclinometer 17 is replaced with a dual axis inclinometer 100 and a second accelerometer 65 is co-located with another inclinometer (either dual axis inclinometer 15 or dual axis inclinometer 100). Under these conditions, the available difference equations increases to six and the angular velocity vector can be estimated as well the angular acceleration vector (i.e. the angular velocity is estimated rather than being the result of integrating the estimates of angular acceleration). The ensuing integration process to estimate the off-vertical angle θ and its direction angle ζ is inherently more stable and less subject to random walk divergence. However, the resulting set of six difference equations now have coefficients that are products of the angular velocity components themselves. This condition means that there will always be some minimum values of the components of angular velocity below which these components can not be estimated without significant error.

Note, if three linear accelerometers (for a total of three accelerometers at locations #1, #2, and #3 in FIG. 5) are used with sensitive axes in the x, y, and z directions, the sensor configuration becomes an inertial reference unit. The discussions above describe how angular motion can be described relative to local horizontal/vertical coordinates. With knowledge of angles, angular velocities, and angular accelerations, the measurements by the three linear accelerometers can be used to estimate the three components of linear acceleration (not caused by differential motion of the inclinometers). Integration of the linear accelerations will then give estimates of position and velocity versus time relative to the time zero conditions.

Over significant periods of time, drifting of components will eventually lead to erroneous measurements for the accelerometers (this is not nearly the problem for the fluid inclinometers). This, in turn, will lead to a steady increase in error of local vertical estimation in addition to the error accruing from random walk divergence. However, for certain applications these effects can be suppressed.

If the host vehicle experiences motion such that long term averaging of the angle off vertical is known to result in zero (i.e. the average angular orientation is alignment with the local vertical/horizontal coordinates), then the non drifting characteristic of the fluid inclinometer can be used to correct the drifting of accelerometer measurements as well as the long term drifting of the off vertical angles estimates caused by random walk. Furthermore, if the two additional accelerometers along the x and y axes are included in the sensor, then deviant estimates of host position and/or velocity estimates can be used to further correct for accelerometer and random walk drifting. For example, mounting of the sensor suite 19 on a ship (of any size) would assure that any estimate of the average vertical position of the ship being other than zero (over a period of time significantly greater than the period of the longest wave motion) would be a direct indication of drift. A constant or steadily increasing error in the estimate of the angle θ would be directly proportional to a constant or steadily increasing error in the estimate of the z acceleration component. This relationship provides the basis for correcting a drifting estimate of the off vertical angle.

Control System

Figure 6:
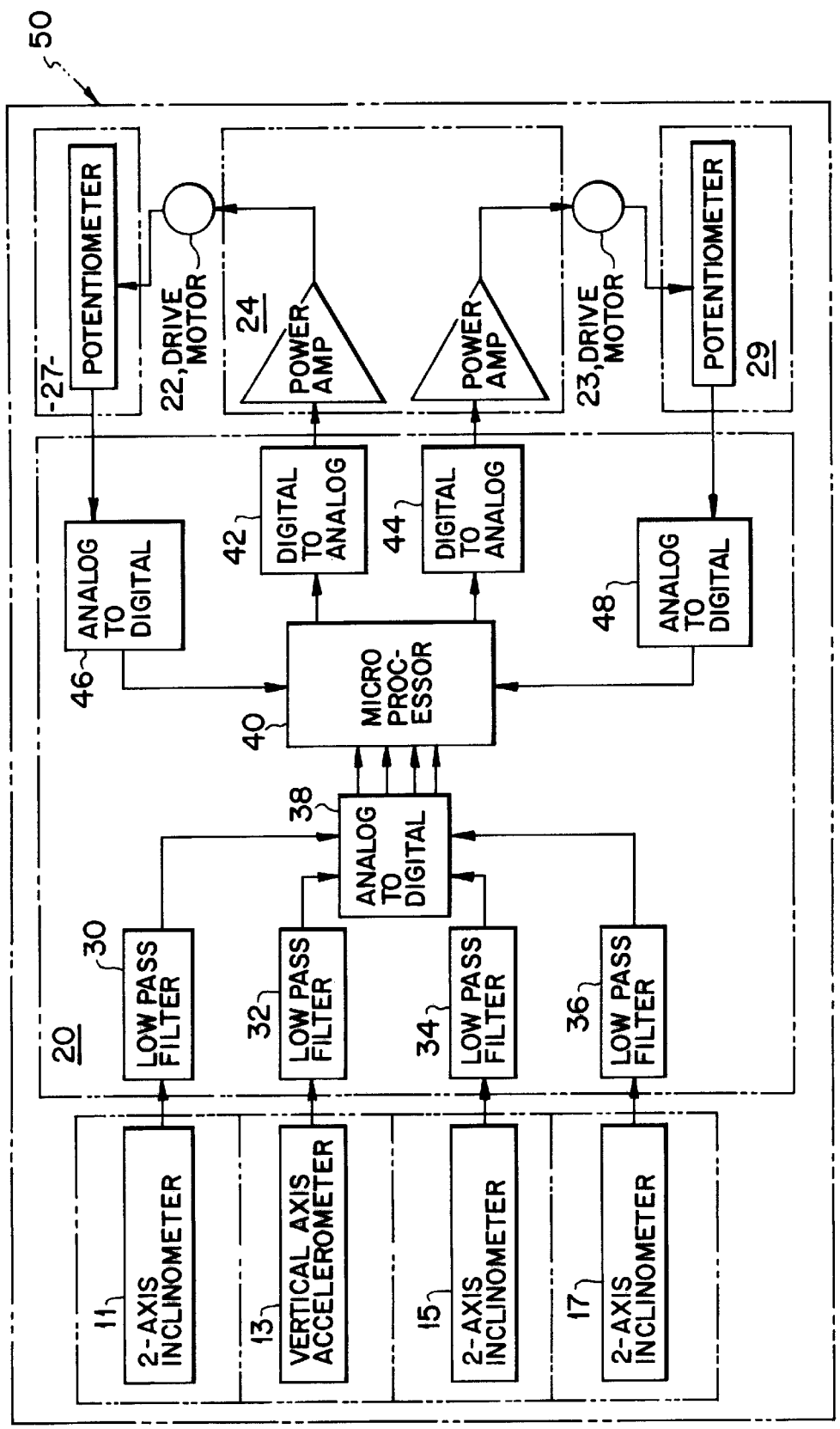
FIG. 6 illustrates a control system in one embodiment of the present invention.

The control system 50, illustrated in FIG. 6 utilizes independent high bandwidth loops for the pitch and roll axes which maintain precision orientation of the stabilized structure 16 relative to the base structure 14. The control loops for pitch and roll are closed through position sensors (potentiometers 27 and 29) which sense the orientation of the stabilized structure 16 axes relative to the base structure 14. The position sensors 27 and 29 may be precision potentiometers, optical encoders or resolvers. The difference between the attitude of the host vehicle's mounting surface and the direction of the local vertical is sensed by the local vertical sensor suite 19 and is differenced with the output of the position sensors 27 and 29 to produce an error signal representing the position of the stabilized structure 16 relative to local vertical. The control loop uses these error signals as position error signals.

The controller 20 makes use of position error and rate error, which are fed back at high gain to maintain precise position control. The position error signal is derived from the difference between the sensed gravitational vector and the stabilized structure position sensor 27 and 29 as previously described. The rate error signal is derived from integrating the acceleration.

The controller 20 electronically computes drive commands to the drive motor power amplifiers 24 for use in stabilizing the stabilized structure 16 relative to the base structure 14. The drive commands may be derived in a completely analog form by the use of an electronic circuit making use of operational amplifiers, or may be derived digitally by microcomputer 40 embedded in the controller 20, as in the preferred embodiment of FIG. 6. Current is produced and transmitted to the drive motors 22 and 23 by power amplifiers 24. The amplifiers 24 accept current commands transmitted from the controller 20 and produce a suitable drive current to the drive motors 22 and 23. The amplifier may be a push-pull d.c. type or a pulse width modulated type.

Control System Operation

The control system 50, illustrated in FIG. 6 of the present application, operates as follows. Outputs of the dual-axis inclinometer 11, dual-axis inclinometer 15, single axis inclinometer 17, and vertical axis inclinometer 13 are fed to low pass filters 30, 32, 34, and 36, respectively. Each of the outputs of the above-identified low pass filters are input to an analog to digital converter 38. Four (4) digital signals, representing outputs of the four (4) sensors described above, are input to microprocessor 40. The microprocessor 40 computes (using the equations in the Processing section of this application) and outputs two (2) digital error signals to digital to analog converters 42 and 44. Outputs from digital to analog converter 42 and 44 are input to power amplifiers 24. The power amplifiers 24 output signals to drive motors 22 and 23 in order to control the movement of these drive motors. Potentiometers 27 and 29 (position sensors) and analog to digital converters 46 and 48, form feed back loops from the stabilized structure 16 to the microprocessor 40. The microprocessor 40 uses the outputs of these feedback loops to adjust the drive control of the motors such that drive is stopped when the desired orientation is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A system comprising:

a stabilized structure;

a base structure for supporting said stabilized structure;

an enclosure to protect said system from environment elements;

first sensor means for measuring angular displacements of said stabilized structure with respect to said base structure; and second sensor means for measuring acceleration data and acceleration vector angles; and processing means for receiving the angular displacements of said stabilized structure with respect to said base structure from said first sensor means and determining an angle of said base structure relative to said stabilized structure, for receiving the acceleration data and acceleration vector angles from said second sensor means and determining a direction of local vertical relative to said base structure, and for maintaining said stabilized structure at a desired orientation utilizing the angle of said base structure relative to said stabilized structure and the direction of local vertical relative to said base structure.

2. The system of claim 1, said processing means maintaining said stabilized structure at the desired orientation by determining a position error from local gravity and a position rate of change of said stabilized structure.

3. The system of claim 2, said processing means outputting drive motor commands, based on the position error from local gravity and the position rate of change of said stabilized structure, to drive motors which move said stabilized structure to the desired orientation.

4. The system of claim 3, said processing means, said second sensor means, and the drive motors forming feedback loops to control said stabilized structure such that said stabilized structure is maintained at the desired orientation.

5. The system of claim 1, said stabilized structure supporting a payload, said stabilized structure including:

a platform, on which the payload is mounted, and which is attached to a dual-axis gimbal via first axis shafts, and a counter balance structure, adjusting counter balance weights to compensate for different payload weights;

said second sensor means being mounted to said base structure or said stabilized platform;

said first sensor means; a first drive motor for rotating said stabilized structure about a first axis; and said dual-axis gimbal, being mounted between said stabilized structure and said base structure; and a second drive motor mounted to said base structure for rotating said stabilized structure about a second axis, orthogonal to the first axis.

6. The system of claim 1, wherein the desired orientation of said stabilized structure is orthogonal to a local gravity vector.

7. The system of claim 1, the wherein a payload mounted to said stabilized structure is an antenna or other type of sensor.

8. The system of claim 1, said first sensor means including two potentiometers for measuring the angular displacements of said stabilized structure relative to said base structure, wherein two axes of said stabilized structure are orthogonal with respect to each other.

9. The system of claim 1, wherein said first sensor means are optical encoders or resolvers.

10. The system of claim 1, said second sensor means including one one-axis accelerometer, one one-axis inclinometer and two two-axis inclinometers for continuously estimating the direction of local vertical.

11. The system of claim 1, said second sensor means including three two-axis inclinometers and two one-axis accelerometers for continuously estimating the direction of local vertical.

12. The system of claim 1, said second sensor means including three two-axis inclinometers and three one-axis accelerometers for continuously estimating the direction of local vertical.

13. The system of claim 1, wherein said enclosure is a dome structure for protecting said system and a payload from the environmental elements and for eliminating forces on said system resulting from the environmental elements.

14. The system of claim 1, said second sensor means, after processing, outputting long term averaging, resulting in the local vertical direction, which is then used to correct drifting and long term divergence caused by random walk phenomena of said second sensor means.

15. The system of claim 7, wherein the antenna is a TV antenna.

16. The system of claim 1, wherein torque effects derived from a host vehicle's motion, on said stabilized structure and drive motors are reduced by a counter balance structure.

17. The system of claim 3, further comprising a counter balance structure which reduces a torque on the drive motors.

18. The system of claim 1, wherein said system weight, size, and power requirements are reduced.

19. The system of claim 3, wherein the drive motors are brushless d.c. motors, stepper motors or brushed d.c. motors.

20. The system of claim 1, wherein said system is used on shipboard.

21. The system of claim 1, wherein said system is used on ground-based vehicles.

22. The system of claim 10, wherein said one one-axis accelerator, said one one-axis inclinometer, and said two two-axis inclinometers are mounted on said base structure in an x–y plane of a coordinate system defined by an x and y axis parallel to axes of rotation of said stabilized structure when a vertical axis of said stabilized structure and a z axis of said base structure are both aligned with the local vertical;

wherein a first of said two two-axis inclinometers, with axes parallel to the x and y axes, and said one one-axis accelerometer, with axes parallel to the z axis, are located on the x axis of the coordinate system and at a specified distance from a center of the coordinate system;

wherein a second of said two two-axis inclinometers, with axes parallel to the x and y axes, is located on the y axis of the coordinate system at a specified distance from the coordinate system center;

wherein said one one-axis inclinometer, with axes parallel to the x axis, is located at specified distances along the x axis and the y axis from the coordinate system center.

23. The system of claim 22, wherein the following equations are used to determine a position of said base structure relative to the local gravity vector:

$(a_{\omega z2}-a_{\omega z1}) \tan \beta_{y2} - (a_{\omega x2}-a_{\omega x1}) = a_{z1}(\tan \beta_{y2} - \tan \beta_{y1})$ $(a_{\omega z2}-a_{\omega z1}) \tan \beta_{x2} (a_{\omega y2}-a_{\omega y1}) = a_{z1}(\tan \beta_{x2} - \tan \beta_{x1})$ $(a_{\omega z3}-a_{\omega z1}) \tan \beta_{x3} - (a_{\omega y3}-a_{\omega y1}) = a_{z1}(\tan \beta_{x3} - \tan \beta_{x1})$.

24. The system of claim 1, wherein the angular displacements, accelerations, and the acceleration vector angles are caused by three-dimensional forces, which vary in time, acting upon said system.

25. A method of maintaining a stabilized structure at a desired orientation, comprising the steps of:

measuring angular displacements of the stabilized structure with respect to a base structure; and measuring acceleration data and acceleration vector angles;

processing the angular displacements of the stabilized structure with respect to the base structure and determining an angle of the base structure relative to the stabilized structure; and processing the acceleration data and acceleration vector angles and determining a direction of local vertical relative to the base structure, and for maintaining the stabilized structure at a desired orientation utilizing the angle of the base structure relative to the stabilized structure and the direction of local vertical relative to the base structure.

26. A system comprising:

a stabilized structure;

a base structure for supporting said stabilized structure;

an enclosure to protect said system from environment elements;

a first sensor for measuring angular displacements of said stabilized structure with respect to said base structure; and a second sensor for measuring acceleration data and acceleration vector angles; and a processor for receiving the angular displacements of said stabilized structure with respect to said base structure from said first sensor and determining an angle of said base structure relative to said stabilized structure, for receiving the acceleration data and acceleration vector angles from said second sensor and determining a direction of local vertical relative to said base structure, and for maintaining said stabilized structure at a desired orientation utilizing the angle of said base structure relative to said stabilized structure and the direction of local vertical relative to said base structure.

27. The system of claim 26, said processor maintaining said stabilized structure at the desired orientation by determining a position error from local gravity and a position rate of change of said stabilized structure.

28. The system of claim 27, said processor outputting drive motor commands, based on the position error from local gravity and the position rate of change of said stabilized structure, to drive motors which move said stabilized structure to the desired orientation.

29. The system of claim 28, said processor, said second sensor, and the drive motors forming feedback loops to control said stabilized structure such that said stabilized structure is maintained at the desired orientation.

30. The system of claim 26, said stabilized structure supporting a payload, said stabilized structure including:

a platform, on which the payload is mounted, and which is attached to a dual-axis gimbal via first axis shafts, and a counter balance structure, adjusting counter balance weights to compensate for different payload weights;

said second sensor being mounted to said base structure or said stabilized platform;

said first sensor; a first drive motor for rotating said stabilized structure about a first axis; and said dual-axis gimbal, being mounted between said stabilized structure and said base structure; and a second drive motor mounted to said base structure for rotating said stabilized structure about a second axis, orthogonal to the first axis.

31. The system of claim 26, wherein the desired orientation of said stabilized structure is orthogonal to a local gravity vector.

32. The system of claim 26, the wherein a payload mounted to said stabilized structure is an antenna or other type of sensor.

33. The system of claim 26, said first sensor including two potentiometers for measuring the angular displacements of said stabilized structure relative to said base structure, wherein two axes of said stabilized structure are orthogonal with respect to each other.

34. The system of claim 26, wherein said first sensor includes optical encoders or resolvers.

35. The system of claim 26, said second sensor including one one-axis accelerometer, one one-axis inclinometer and two two-axis inclinometers for continuously estimating the direction of local vertical.

36. The system of claim 26, said second sensor including three two-axis inclinometers and two one-axis accelerometers for continuously estimating the direction of local vertical.

37. The system of claim 26, said second sensor including three two-axis inclinometers and three one-axis accelerometers for continuously estimating the direction of local vertical.

38. The system of claim 26, wherein said enclosure is a dome structure for protecting said system and a payload from the environmental elements and for eliminating forces on said system resulting from the environmental elements.

39. The system of claim 26, said second sensor, after processing, outputting long term averaging, resulting in the local vertical direction, which is then used to correct drifting and long term divergence caused by random walk phenomena of said second sensor means.

40. The system of claim 32, wherein the antenna is a TV antenna.

41. The system of claim 26, wherein torque effects derived from a host vehicle's motion, on said stabilized structure and drive motors are reduced by a counter balance structure.

42. The system of claim 28, further comprising a counter balance structure which reduces a torque on the drive motors.

43. The system of claim 26, wherein said system weight, size, and power requirements are reduced.

44. The system of claim 28, wherein the drive motors are brushless d.c. motors, stepper motors or brushed d.c. motors.

45. The system of claim 26, wherein said system is used on shipboard.

46. The system of claim 26, wherein said system is used on ground-based vehicles.

47. The system of claim 35, wherein said one one-axis accelerator, said one one-axis inclinometer, and said two two-axis inclinometers are mounted on said base structure in an x–y plane of a coordinate system defined by an x and y axis parallel to axes of rotation of said stabilized structure when a vertical axis of said stabilized structure and a z axis of said base structure are both aligned with the local vertical;

wherein a first of said two two-axis inclinometers, with axes parallel to the x and y axes, and said one one-axis accelerometer, with axes parallel to the z axis, are located on the x axis of the coordinate system and at a specified distance from a center of the coordinate system;

wherein a second of said two two-axis inclinometers, with axes parallel to the x and y axes, is located on the y axis of the coordinate system at a specified distance from the coordinate system center;

wherein said one one-axis inclinometer, with axes parallel to the x axis, is located at specified distances along the x axis and the y axis from the coordinate system center.

48. The system of claim 47, wherein the following equations are used to determine a position of said base structure relative to the local gravity vector:

$$(\alpha_{\omega z2} - \alpha_{\omega z1}) \tan \beta_y 2 - (\alpha_{\omega x2} - \alpha_{\omega x1}) = \alpha_z 1 (\tan \beta_y 2 - \tan \beta_y 1)$$

$$(\alpha_{\omega z2} - \alpha_{\omega z1}) \tan \beta_x 2 - (\alpha_{\omega y2} - \alpha_{\omega y1}) = \alpha_z 1 (\tan \beta_x 2 - \tan \beta_x 1)$$

$$(\alpha_{\omega z3} - \alpha_{\omega z1}) \tan \beta_x 3 - (\alpha_{\omega y3} - \alpha_{\omega y1}) = \alpha_z 1 (\tan \beta_x 3 - \tan \beta x 1).$$

49. The system of claim 26, wherein the angular displacements, accelerations, and the acceleration vector angles are caused by three-dimensional forces, which vary in time, acting upon said system.

* * * * *